R. H. ANDERSON.
APPARATUS AND PROCESS FOR MAKING SHEETS, SLABS, AND SIMILAR ARTICLES.
APPLICATION FILED OCT. 30, 1913.

1,268,203.

Patented June 4, 1918.
2 SHEETS—SHEET 2.

Attest:

Inventor: Robert H. Anderson
by Edwards, Sager & Wooster
Atty

UNITED STATES PATENT OFFICE.

ROBERT H. ANDERSON, OF AMBLER, PENNSYLVANIA, ASSIGNOR TO ASBESTOS SHINGLE, SLATE & SHEATHING COMPANY, A CORPORATION OF PENNSYLVANIA.

APPARATUS AND PROCESS FOR MAKING SHEETS, SLABS, AND SIMILAR ARTICLES.

1,268,203. Specification of Letters Patent. Patented June 4, 1918.

Application filed October 30, 1913. Serial No. 798,160.

*To all whom it may concern:*

Be it known that I, ROBERT H. ANDERSON, a citizen of the United States, residing at Ambler, in the county of Montgomery and State of Pennsylvania, have invented certain new and useful Improvements in Apparatus and Processes for Making Sheets, Slabs, and Similar Articles, of which the following is a full, clear, and exact specification.

This invention relates to an apparatus and process for making sheets, slabs and similar articles. The material employed is preferably hydraulic cement and asbestos, although, as will hereinafter appear, other materials may in some cases be employed.

In the manufacture of material of this character it is customary to follow the process of paper making and to employ machines which build up the material upon a cylinder until it reaches the desired thickness, whereupon it is cut along the line of a longitudinal groove in the said cylinder, and the sheet thus formed is removed. Attempts have been made to make the process continuous, but such proposals as have heretofore been made involve certain objectionable features, such as improperly mixing the materials and the necessary water used in the process, or improperly compressing the material, or leaving upon the resultant product water course marks, or fabric marks, or the production of weak and unsubstantial product.

Figure 1:
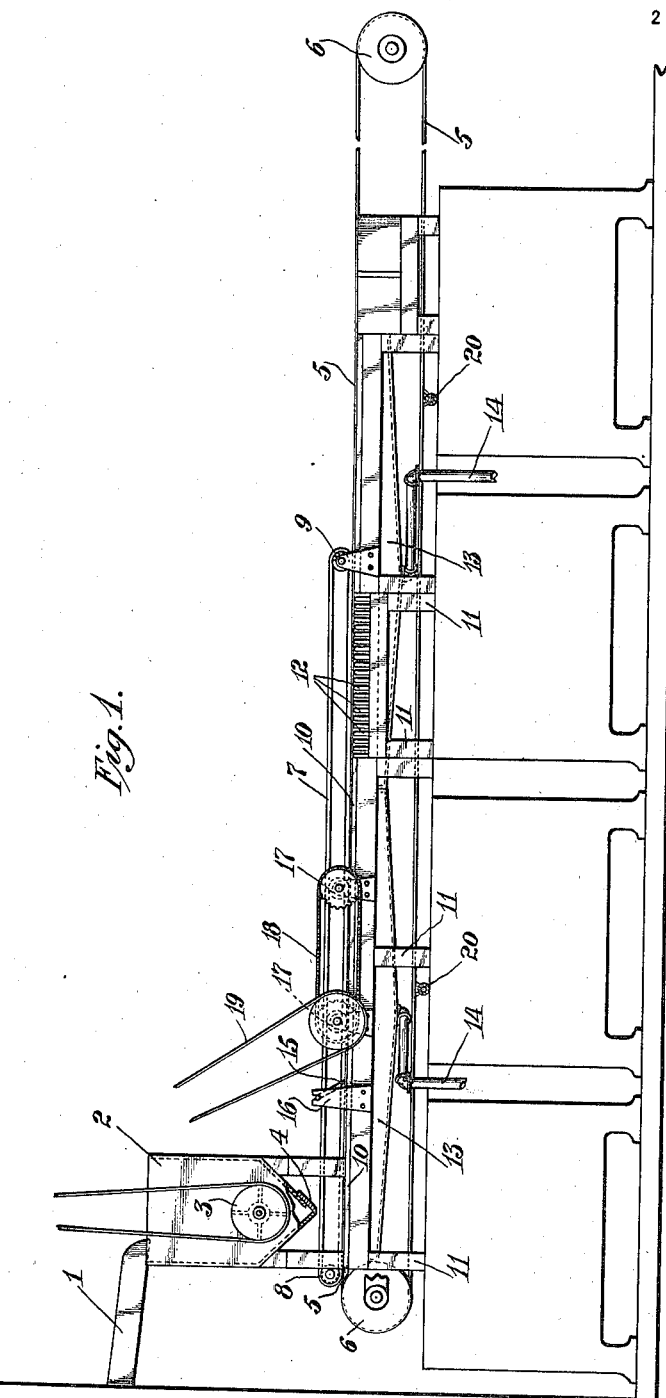
Figure 2:
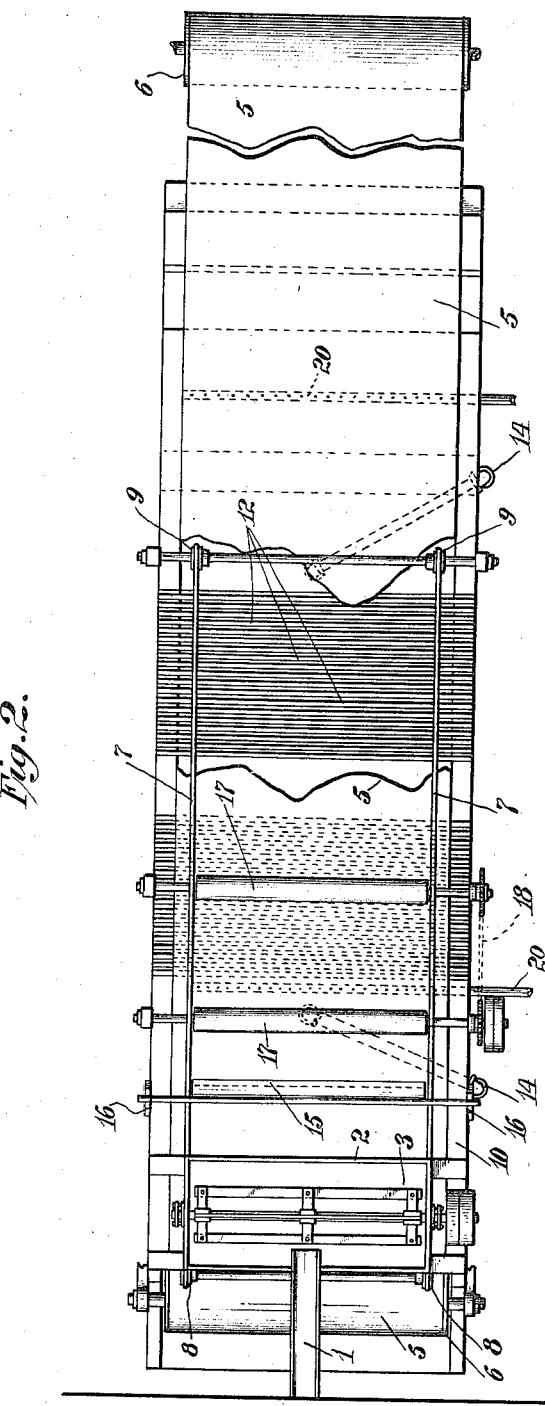

In the accompanying drawings, Figure 1 represents a side view of one form of apparatus for carrying into effect my invention, and Fig. 2 is a plan view of the apparatus shown in Fig. 1.

1 represents a chute leading from a suitable tank or mixing device, and conveying the material to be worked up into sheets or slabs. In the present instance, it is assumed to be a mixture of hydraulic cement, asbestos fibers and water, the mixture containing only sufficient water to make the material flowable. From the chute 1 the material discharges into the mixer 2 containing a beating device 3 driven by suitable power. Along the lower end of the mixer 2 is a longitudinal opening controlled by a sliding gate 4, which may be adjusted to permit the material to flow from hopper 2 in a sheet of the desired thickness. The sheet of material discharges on to an endless porous belt 5, carried by rollers 6, 6. The sides of the belt are protected by rubber deckles 7, 7, carried by pulleys 8, 8 and 9, 9. The uppermost part of the endless belt 5 slides upon and is supported by the table 10, which in turn is supported by a suitable framework and supports 11, 11. On the table 10 are located one or more suction devices. As shown in the drawings, these consist of wooden bars 12, 12, having air spaces between the same, and suitable bottoms 13, 13 inclose the lower side of the table and the suction devices, whereby suitable air pumps connected by pipes 14 to the bottoms 13 will suck air through the upper side of the felt, the suction devices 12 and pipes 14. Any other suitable form of suction device may be employed, if desired, in place of the one described.

An adjustable leveling plate 15 is mounted at its ends upon the supports 16, 16 carried by the frame, and one or more additional leveling devices are distributed along the table. In the drawings these are shown as rollers 17, 17 geared to each other by a chain drive 18 and driven by suitable power through a belt 19.

In order to suitably clean the endless belt suitable spraying devices 20, 20 are distributed underneath the belt and supplied with water under pressure, which water discharges upon the under side of the belt and cleans the same.

In the operation of the apparatus, the properly mixed material flows through the opening controlled by gate 4 on to the upper sides of the endless belt 5. As the belt moves forward, the leveling device 15 acts to level the material to a sheet of desired thickness, and also to permit the water, which is in excess, to dam up and flow freely upon all parts of the mixture. As the belt moves forward the material passes under one or more additional leveling devices, which in the drawings are shown as rollers. It is preferable that these shall not act to compress the material at this time, as it is desired to permit the water to permeate freely to all parts of the material in advance of any pressure being exerted thereon. After the ingredients and the water have been thoroughly mixed and the material leveled by the leveling devices, the felt passes over the suction boxes 12, 12, and the suction draws the water from the material so that 11 when the material has passed the suction boxes most of the water will have been withdrawn and the material will be in the form of a sheet of sufficient tenacity to be capable of being handled. It is then placed in a hydraulic press and after compression the cement is allowed to set, according to well known processes of handling this class of material.

By the process above set forth, the material is assured of being thoroughly wet in all parts, leveled and most of the water withdrawn before compression and ultimate setting, and the formation of dry spots is avoided. Furthermore, by reason of the fact that the leveling devices are not required to exert pressure, it is much easier to prevent the material from sticking to the rollers or leveling devices, and it is unnecessary to use a fabric on the upper side of the material to prevent it from sticking to the rolls or scrapers.

Instead of employing a mixture of hydraulic cement and asbestos various other materials may be employed in admixture with water. For example, there may be employed a mixture of plaster-of-Paris and asbestos, or lime and asbestos, either with or without sand or other filling or combining material, or the mixture may be plaster-of-Paris, cement and asbestos, or starch, lime, cement and asbestos, or sulfite pulp, asbestos and cement, or plaster-of-Paris, sulfite pulp, asbestos and cement, or lime, sulfite pulp and asbestos, all either with or without infusorial earth or glue, casein, or other similar filling or combining material. These various mixtures with a suitable quantity of water to render the materials flowable may be run through the machine in the manner above described, and the product preferably compressed before being allowed to set.

It will be found convenient, of course, to cut the web into sheets as the web issues from the machine, and before the sheets are compressed and allowed to set.

Various modifications of the apparatus above described may be made in carrying out my invention.

Having thus described my invention, I declare that what I claim as new and desire to secure by Letters Patent, is:—

1. In a machine for treating moist material, the combination with a traveling belt, of means for depositing the material on the belt, a table for supporting the belt, a leveling means determining the thickness of the material on the belt and backing up the excess of water onto the material above said table, and means subsequent to said leveling means for removing moisture from the material.

2. In a machine for treating moist material, the combination with a traveling belt, of means for depositing the material on the belt, a leveling means determining the thickness of the material on the belt and backing up the excess water onto the material in front of it so that the material at this point is thoroughly wetted, and means for subsequently further flattening the material into a sheet.

3. In a machine of the character described, the combination of an endless belt of porous material, deckles at the sides thereof, means for flowing the material to be worked upon said belt, a leveling device adapted to level the material to the desired thickness without compressing the material and to distribute the excess of water thereon, and a suction device adapted to remove water from said material after it has passed the leveling devices and before it has been compressed or set.

4. The process for making sheets, slabs, or the like, which comprises moistening the material, passing the material continuously through flattening means, which squeezes out a part of the water, permitting the excess water to accumulate in front of the flattening means to throughly wet the material at this point, and subsequently hardening said material into sheets, slabs, or the like.

5. The process of making sheets, slabs or the like, which comprises depositing the material on a support, leveling the material to flatten it, permitting the excess water to accumulate in front of the leveling means to wet the material at this point, and subsequently hardening the material into sheets, slabs or the like.

In testimony whereof I affix my signature, in presence of two witnesses.

ROBT. H. ANDERSON.

Witnesses:
  REES C. ROBERTS,
  JNO. L. SHOEMAKER.